United States Patent
Zhang et al.

(10) Patent No.: US 12,041,652 B2
(45) Date of Patent: *Jul. 16, 2024

(54) CHANNEL ACCESS METHOD AND DEVICE, AND STORAGE MEDIUM

(71) Applicant: ZTE Corporation, Guangdong (CN)

(72) Inventors: Bo Zhang, Guangdong (CN); Kaiying Lv, Guangdong (CN); Zhiqiang Han, Guangdong (CN)

(73) Assignee: ZTE Corporation, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/682,881

(22) Filed: Feb. 28, 2022

(65) Prior Publication Data
US 2022/0256588 A1     Aug. 11, 2022

Related U.S. Application Data (63) Continuation of application No. 16/609,065, filed as application No. PCT/CN2018/083187 on Apr. 16, 2018, now Pat. No. 11,265,913.

(30) Foreign Application Priority Data

Apr. 28, 2017   (CN) .......................... 201710293298.3

(51) Int. Cl.
*H04W 74/00* (2009.01)
*H04W 74/06* (2009.01)

(52) U.S. Cl.
CPC ......... *H04W 74/002* (2013.01); *H04W 74/06* (2013.01)

(58) Field of Classification Search
CPC .... H04L 25/02; H04W 74/00; H04W 74/002; H04W 74/06
See application file for complete search history.

(56) References Cited

U.S. PATENT DOCUMENTS

| | | | |
|---|---|---|---|
| 10,523,361 B2 | 12/2019 | Chun et al. |
| 10,595,341 B2 | 3/2020 | Kim et al. |

(Continued)

FOREIGN PATENT DOCUMENTS

| | | | |
|---|---|---|---|
| CN | 103260168 A | 8/2013 |
| CN | 105592476 A | 5/2016 |

(Continued)

OTHER PUBLICATIONS

Supplementary European Search Report issued in EP Patent Application No. 18791907, dated Dec. 2, 2020, 2 pages.

(Continued)

*Primary Examiner* — Stephen J Clawson
(74) *Attorney, Agent, or Firm* — Perkins Coie LLP (57) ABSTRACT

Provided is a channel access method. The method includes: after a radio frame is received, determining that the radio frame is an overlapping basic service set (OBSS) radio frame; determining that the OBSS radio frame is a radio frame of a specified type or determining whether the OBSS radio frame carries specific spatial multiplexing instruction information; updating a local network allocation vector according to duration information carried in the OBSS radio frame; and performing channel access according to the local network allocation vector. Provided are a channel access device and a storage medium.

20 Claims, 3 Drawing Sheets

(56) References Cited

U.S. PATENT DOCUMENTS

| | | | |
|---|---|---|---|
| 10,820,304 B2 | 10/2020 | Luo et al. | |
| 2006/0291544 A1* | 12/2006 | Fischer | H04B 7/0634 |
| | | | 375/267 |
| 2011/0116401 A1 | 5/2011 | Banerjea et al. | |
| 2012/0155415 A1* | 6/2012 | Seok | H04W 72/0406 |
| | | | 370/329 |
| 2014/0169290 A1 | 6/2014 | Seok | |
| 2015/0110093 A1 | 4/2015 | Asterjadhi et al. | |
| 2016/0330732 A1 | 11/2016 | Moon et al. | |
| 2016/0330788 A1* | 11/2016 | Zheng | H04W 28/0205 |
| 2017/0070914 A1* | 3/2017 | Chun | H04L 1/0075 |
| 2017/0094685 A1 | 3/2017 | Noh et al. | |
| 2017/0171878 A1 | 6/2017 | Chun et al. | |
| 2017/0188376 A1 | 6/2017 | Noh et al. | |
| 2017/0230837 A1* | 8/2017 | Huang | H04B 7/0452 |
| 2017/0311352 A1 | 10/2017 | Lv et al. | |
| 2018/0288800 A1 | 10/2018 | Yu et al. | |
| 2019/0313328 A1 | 10/2019 | Ma | |
| 2019/0327741 A1 | 10/2019 | Li et al. | |
| 2022/0030604 A1* | 1/2022 | Noh | H04W 72/04 |

FOREIGN PATENT DOCUMENTS

| | | | | |
|---|---|---|---|---|
| CN | 106376093 A | 1/2017 | | |
| EP | 3313140 A1 * | 4/2018 | | H04L 69/22 |
| EP | 3313140 A1 | 4/2018 | | |
| EP | 3876657 A1 * | 9/2021 | | H04W 74/08 |
| WO | 2014173307 A1 | 10/2014 | | |
| WO | 2016003056 A1 | 1/2016 | | |
| WO | 2016062263 A1 | 4/2016 | | |
| WO | 2017007266 A1 | 1/2017 | | |
| WO | 2017012182 A1 | 1/2017 | | |
| WO | 2017026833 A1 | 2/2017 | | |

OTHER PUBLICATIONS

International Search Report for corresponding application PCT/CN2018/083187 filed Apr. 16, 2018, mail date of Jun. 27, 2018.
Luo et al., "OBSS NAV and PD Threshold Rule for spatial Reuse," IEEE802.11-15/1109r1, Sep. 2015, (IEEE802.11, Sep. 13, 2015), 20 pages.
Cariou et al., "Proposed Text Changes for OBSS PD-based SR parameters," IEEE802.11-16/0947r20, Jan. 2017, (IEEE802.11, Sep. 12, 2016), 16 pages.
European Communication pursuant to Article 94(3) EPC for EP Patent Application No. 18791907.1, dated Mar. 17, 2023, 6 pages.
Chinese office action issued in CN Patent Application No. 201710293298.3, dated Apr. 22, 2023, 13 pages. English translation included.
Chinese office action issued in CN Patent Application No. 201710293298.3, dated Nov. 16, 2022, 18 pages. English translation included.
Korean office action issued in KR Patent Application No. 10-2019-7035177, dated Oct. 13, 2020, 16 pages. English translation included.
Korean office action issued in KR Patent Application No. 10-2019-7035177, dated Apr. 23, 2021, 5 pages. English translation included.
Korean notice of allowance issued in KR Patent Application No. 10-2019-7035177, dated Jul. 21, 2021, 14 pages. English machine translation included.
Chinese Notification to Complete Formalities of Registration issued in CN Patent Application No. 201710293298.3, dated Oct. 7, 2023, 4 pages. English translation included.

* cited by examiner

NDP frame format ← N →

FIG. 7

CHANNEL ACCESS METHOD AND DEVICE, AND STORAGE MEDIUM

CROSS-REFERENCE TO RELATED APPLICATIONS

This application is a continuation of and claims the benefit of priority to U.S. patent application Ser. No. 16/609,065, filed on Oct. 28, 2019, which is a national stage application under 35 U.S.C. 371 based on international patent application PCT/CN2018/083187, filed on Apr. 16, 2018, which claims priority to a Chinese patent application No. 201710293298.3 filed on Apr. 28, 2017, disclosures of each of which are incorporated herein by reference in their entireties.

TECHNICAL FIELD

The present disclosure relates to the field of wireless communication and, in particular, to a channel access method and device, and a storage medium.

BACKGROUND

At present, the number of various Internet of Things devices in the wireless communication system is increased rapidly, network load is getting heavier, and communication efficiency is also decreased accordingly. For such deployment of dense scenarios, wireless local area networks (WLAN) aim to improve the network throughput, and introduce technologies such as OFDMA (orthogonal-frequency division multiplexing access (FDMA)) and spatial multiplexing. Therefore, in a case where bandwidth is unchanged, more WLAN devices are capable of being accessed and long-distance access is supported.

The spatial multiplexing technology enables stations in different basic service sets (BSS) to multiplex a same channel at same time for transmission, thereby improving the network throughput. The basic principle of the spatial multiplexing is that when an overlapping basic service set (OBSS) is received and a received power is detected to be less than a certain threshold, this frame may be ignored, the channel is considered to be idle, and backoff is performed to content for accessing the channel for data transmission. In a manageable network, multiple BSS networks will be pre-configured as a spatial reuse group (SRG), and a certain BSS station in the group uses a higher overlapping basic service set-power detection (OBSS-PD) threshold to perform the spatial multiplexing transmission, thereby improving the transmission opportunity of the spatial multiplexing, such technology is called as SRG OBSS-PD based spatial reuse (SR).

However, for the sender in the BSS, the transmission duration of some frames is not expected to be multiplexed by third-party stations. If the transmission duration is multiplexed, the transmission effect will be poor, and the subsequent data transmission may even be affected. For example, the stations of the BSS send a channel measurement frame, and a channel measurement result is used as a basis for performing a beamforming when the stations subsequently send the data. In the specific communication process, it is found that if the beamforming is performed on the subsequently sent data according to the channel measurement result, the transmission data may not be successfully received or decoded, or a problem of large transmission interference is caused.

SUMMARY

The present disclosure provides a channel access method and device, and a storage medium for solving problem that interferences to a beamforming are great.

A channel access method includes: after a radio frame is received, determining that the radio frame is an overlapping basic service set (OBSS) radio frame; determining that the OBSS radio frame is a radio frame of a specified type or determining whether the OBSS radio frame carries specific spatial multiplexing instruction information; in response to determining that the OBSS radio frame is the radio frame of the specified type or the OBSS radio frame carries the specific spatial multiplexing instruction information, updating a local network allocation vector according to duration information carried in the radio frame; and performing channel access according to the local network allocation vector.

A channel access device includes a determination module, which is configured to determine that a radio frame is an overlapping basic service set (OBSS) radio frame after the radio frame is received, and determine that the radio frame is a radio frame of a specified type or determine whether the radio frame carries spatial multiplexing instruction information; an updating module, which is configured to update a local network allocation vector according to duration information carried in the radio frame; and an access module, which is configured to perform channel access according to the local network allocation vector.

A channel access device includes a memory and a processor.

The memory is configured to store instructions.

The processor is configured to execute the instructions stored in the memory to implement the above channel access method.

A channel access method includes: sending a radio frame, the radio frame is a radio frame of a specified type and/or carries specific spatial multiplexing instruction information.

A channel access device includes a sending module, which is configured to send a radio frame, the radio frame is a radio frame of a specified type or carries specific spatial multiplexing instruction information.

A channel access device includes a memory and a processor, where the memory is configured to store instructions, and the processor is configured to execute the instructions stored in the memory to implement the above channel access method.

A computer storage medium for storing computer-executable instructions, where after being executed, the computer-executable instructions are capable of implementing the channel access method provided by one or more technical solutions.

In summary, the embodiments of the present disclosure provide a channel access method and device, and a storage medium. The OBSS station may detect and receive the type of the OBSS radio frame or determine whether the OBSS radio frame carries the specific spatial multiplexing instruction information which may be the instruction information for prohibiting the spatial multiplexing. If this OBSS radio frame is the radio frame of the specified type prohibiting the spatial multiplexing, or this OBSS radio frame carries the specific spatial multiplexing instruction information prohibiting the spatial multiplexing, it indicates that the corresponding OBSS radio frame prohibits the spatial multiplexing. The station updates the local network allocation vector according to the duration information of the OBSS radio frame prohibiting the spatial multiplexing, so that when the station initiates the channel access according to the updated local network allocation vector, the station automatically avoids initiating the channel access when the OBSS radio frame prohibiting the spatial multiplexing transmits because a channel corresponding to the OBSS radio frame prohibiting the spatial multiplexing has been occupied by other stations, thereby reducing the failure rate of channel access initiation and reducing interference of this station to data transmission of other stations occupying this channel.

DETAILED DESCRIPTION

Objects, technical solutions and advantages of the present invention will be clearer from a detailed description of embodiments of the present invention in conjunction with the drawings.

It is to be noted that if not in collision, the embodiments and features therein in the present application may be combined with each other.

If spatial multiplexing is allowed to be performed on a radio frame, the transmission of the radio frame may be influenced, and subsequent data transmission will possibly be influenced. When a receiving station performs channel access, whether a channel is idle is determined according to a local network allocation vector. If the channel is idle, the access channel is contented; otherwise, the backoff is performed. In the embodiment of the present disclosure, to avoid that spatial multiplexing influences the transmission of the radio frame and the channel access of the receiving station, before the receiving station performs the channel access, the radio frame is determined to be an OBSS radio frame, it is determined that the OBSS radio frame is a radio frame of a specified type or that the OBSS radio frame carries specific spatial multiplexing instruction information, and such information reconfigures the local network allocation vector. If the local network allocation vector is updated, it is equivalent to update time of the station requesting for accessing to a channel occupied by the OBSS radio frame, thereby avoiding the problem that when one station has already occupied the channel, the station continues to request for accessing, causes a failure of the request for accessing, and causes influence to the data transmission of other stations.

Figure 1:
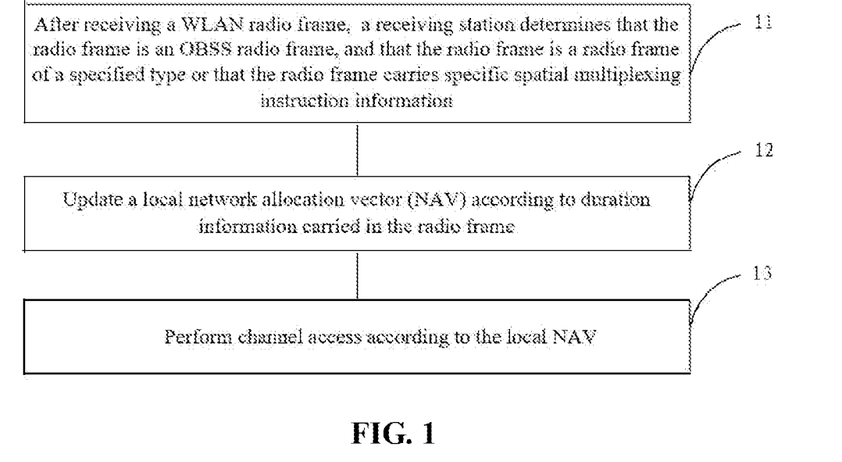
FIG. 1 is a flowchart of a channel access method according to an embodiment of the present disclosure.

FIG. 1 is a flowchart of channel access method on a receiving end according to an embodiment of the present disclosure. As shown in FIG. 1, the method includes the steps described below.

In step 11, after receiving a WLAN radio frame, a receiving station determines that the radio frame is an OBSS radio frame, and that the radio frame is a radio frame of a specified type or that the radio frame carries specific spatial multiplexing instruction information. Here, whether the OBSS radio frame is the radio frame of the specified type is determined and whether the OBSS radio frame carries the specific spatial multiplexing instruction information is determined. The specific spatial multiplexing instruction information may be instruction information for prohibiting spatial multiplexing.

In step 12, a local network allocation vector (NAV) is updated according to duration information carried in the radio frame. The step 12 may include that if the OBSS radio frame is the radio frame of the specified type or the OBSS radio frame carries the specific spatial multiplexing instruction information, it is indicated that the OBSS radio frame in currently received radio frame is an OBSS radio frame prohibiting the spatial multiplexing. Therefore, in the step 12, the local network allocation vector is updated according to the duration information of the OBSS radio frame prohibiting the spatial multiplexing. The updated local network allocation vector may represent an end time of a transmission opportunity in which the OBSS radio frame prohibiting the spatial multiplexing is located.

In step 13, channel access is performed according to the NAV. In this way, access is performed according to the NAV which considers the interfere of the spatial multiplexing to the radio frame transmission, before the end time of the transmission opportunity in which the OBSS radio frame prohibiting the spatial multiplexing is located, a channel in which the OBSS radio frame prohibiting the spatial multiplexing is located is requested for being accessed or not, thereby reducing the request access failure and reducing data parameters of a station requesting for accessing the channel which has occupied the OBSS radio frame prohibiting the spatial multiplexing at the same time, and reducing the interference to other stations.

In some embodiments, the duration information carried in the radio frame indicates a remaining transmission time of a transmission opportunity (TxOP). Within a transmission opportunity, the sending station and the receiving station may perform exchange of one or more radio frames.

For example, the sending station sends a radio frame, and the receiving station confirms to response the received radio frame, which may be considered to be exchange of one radio frame.

In some embodiments, a receiving end receives the WLAN radio frame, the step of determining that the radio frame is the OBSS radio frame includes: determining that the radio frame is the OBSS radio frame according to basic service set (BSS) identification information of a physical signaling domain of the radio frame.

In some embodiments, before determining that the radio frame is a radio frame of a specified type, the method further includes: determining that a physical signaling domain of the radio frame carries the specific spatial multiplexing instruction information.

The specific spatial multiplexing instruction information includes: instruction information for prohibiting the spatial multiplexing or instruction information for delaying the multiplexing.

The instruction information for prohibiting the spatial multiplexing is instruction information for prohibiting spatial multiplexing based on an OBSS signal detection threshold and/or prohibiting spatial multiplexing based on a spatial multiplexing parameter.

In some embodiments, the receiving station receives the radio frame, and determines that this frame is from an OBSS network by a BSS color, values of a length field and a spatial streams (Nsts) field may be parsed from a physical layer. According to whether the values of the length field and the Nsts field satisfy a preset pairing relationship, whether the radio frame is a channel measurement frame is determined.

If this frame is an NDP frame, the NAV is updated by using a value of a TXOP duration domain in the physical layer, and the spatial multiplexing is prohibited.

If this frame is not the NDP frame, a spatial multiplexing domain is viewed. According to a spatial multiplexing instruction in physical layer signaling and a frame type indication of the physical layer, whether the spatial multiplexing instruction and the frame type indication of the physical layer satisfy a determination condition. If the spatial multiplexing instruction and the frame type indication of the physical layer satisfy the determination condition, the NAV is updated by using duration information in the physical layer. If the spatial multiplexing instruction satisfies the determination condition, and the frame type of the physical layer does not satisfy the determination condition, a specified frame type is determined from a medium access layer data unit. If the specified frame type is determined, the NAV is updated by using the duration information carried by the medium access layer data unit.

The determination condition of the spatial multiplexing instruction is that: the spatial multiplexing instruction indicating it is not allowable to perform the spatial multiplexing is configured to SR-delay, SRP-Disallow or SRP/OBSS PD-Disallow during this frame. The frame type of the physical layer is a trigger-based physical packet data unit (PPDU).

If the spatial multiplexing instruction is configured to be SR-Delay, whether this frame is the trigger-based PPDU is determined according to a frame format of the physical layer. If the frame is the trigger-based PPDU, the NAV is updated by using the TXOP duration domain in the physical layer and the spatial multiplexing is prohibited.

If the spatial multiplexing instruction is configured to be SR-Delay, and the frame type is not an NDP frame or the trigger-based PPDU, a medium access control (MAC) frame is further parsed, and then whether a first radio frame is a null data packet announcement (NDPA) frame, a channel information feedback poll trigger (trigger Beamforming report poll) frame, or a channel information (Beamforming) feedback frame is determined by determining a type and/or a subtype.

From a MAC layer, a type of the radio frame of the specified type is determined to be a channel measurement announcement (NDPA) frame, a channel information feedback poll trigger frame or a channel information feedback frame.

In some embodiments, the step in which the local network allocation vector is updated according to the duration information carried in the radio frame includes:

A transmission opportunity duration domain of the radio frame is parsed from the physical layer, the NAV is updated according to the parsed value of the transmission opportunity duration domain, and the channel access/spatial multiplexing is prohibited during a period in which the NAV is not a zero.

Optionally, a value in the duration domain in the signaling domain is parsed from the medium access layer, and the NAV is updated according to the value.

In a process of receiving a type of a frame sending by an OBSS station, the embodiment of the present disclosure may perform a channel access operation based on spatial multiplexing or a channel access operation based on non-spatial multiplexing. By adopting the solution of the present disclosure, the station can quickly identify a channel measurement frame interaction sequence in a channel access mode with the spatial multiplexing or a channel access mode with the non-spatial multiplexing.

Figure 2:
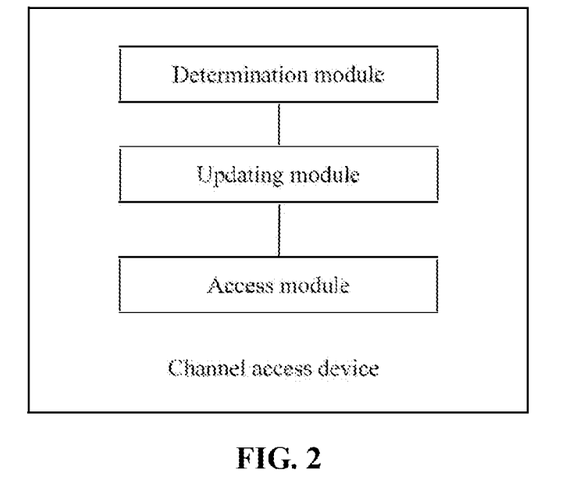
FIG. 2 is a schematic diagram of a channel access device according to an embodiment of the present disclosure.

FIG. 2 is a schematic diagram of a channel access device of a receiving station of a radio frame according to an embodiment of the present disclosure. As shown in FIG. 2, the device in the embodiment includes: a determination module, which is configured to determine that a radio frame is an overlapping basic service set (OBSS) radio frame after the radio frame is received, and determine that the radio frame is a radio frame of a specified type or determine that the radio frame carries specific spatial multiplexing instruction information; an updating module, which is configured to update a local network allocation vector according to duration information carried in the radio frame; and an access module, which is configured to perform channel access according to the local network allocation vector.

In some embodiments, the step in which the determination module is configured to determine that the radio frame is the OBSS radio frame includes: determining that the radio frame is the OBSS radio frame according to basic service set (BSS) identification information of the physical signaling domain of the radio frame.

In some embodiments, before determining that the radio frame is the radio frame of the specified type, the method further includes: determine that the physical signaling domain of the radio frame carries the spatial multiplexing instruction information, the spatial multiplexing instruction information includes: instruction information for prohibiting spatial multiplexing or instruction information for delaying the spatial multiplexing, the instruction information for prohibiting the spatial multiplexing is instruction information for prohibiting spatial multiplexing based on an OBSS signal detection threshold and/or prohibiting spatial multiplexing based on a spatial multiplexing parameter. Here, if an OBSS radio frame is prohibited or delayed the spatial multiplexing, it is indicated that the spatial multiplexing is unable to be performed on a time domain corresponding to the OBSS radio frame, and indicated that the spatial multiplexing is prohibited on a channel corresponding to the OBSS radio frame.

In some embodiments, determining that the radio frame is the radio frame of the specified type is implemented by at least one of: determining that the radio frame is the radio frame of the specified type according to a parameter in the physical layer signaling domain; and determining that the radio frame is the radio frame of the specified type according to a parameter in a signaling domain of a medium access layer data unit.

In some embodiments, determining that the radio frame is the radio frame of the specified type according to the parameter in the physical layer signaling domain includes: parsing values of a length field and a Nsts field from the physical layer signaling domain, if the values of the length field and the Nsts field satisfy a preset pairing relationship, determining that the radio frame is a channel measurement frame, or determining that the radio frame is the radio frame of the specified type according to physical frame format indication information.

In some embodiments, the step in which the determining module is configured to determine that the radio frame is the radio frame of the specified type according to the parameter in the signaling domain of the medium access layer protocol data unit includes: parsing a type domain and/or a subtype domain of the radio frame from the signaling domain of the medium access control layer protocol data unit, and determining that the radio frame is the radio frame of the specified type according to the type domain and/or the subtype domain.

In some embodiments, the step in which the determination module is configured to determine that the radio frame is the radio frame of the specified type according to the type domain and/or the subtype domain includes: determining that the radio frame is a channel measurement announcement frame; a channel information feedback poll trigger frame; a channel information feedback frame according to the type domain and/or the subtype domain.

In some embodiments, the step in which the updating module is configured to update the local network allocation vector according to the duration information carried in the radio frame includes: updating the local network allocation vector according to transmission opportunity duration information carried in the physical layer signaling domain of the radio frame, or updating the local network allocation vector according to duration information carried in a medium access layer signaling domain of the radio frame.

The embodiment of the present disclosure further provides a channel access device including a memory and a processor.

The memory is configured to store the following instructions: after a radio frame is received, determining that the radio frame is an overlapping basic service set (OBSS) radio frame, and determining that the radio frame is a radio frame of a specified type or determining that the radio frame carries specific spatial multiplexing instruction information.

The processor is configured to execute the instructions stored in the memory.

Embodiment Three

Figure 3:
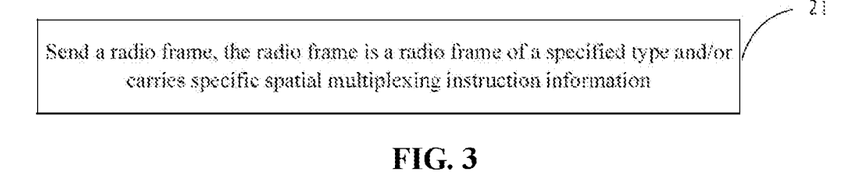
FIG. 3 is a flowchart of a channel access method according to an embodiment of the present disclosure.

As shown in FIG. 3, the embodiment of the present disclosure provides a channel access method. For a sending station, the sending station belongs to an SRG network, and includes the steps described below.

In step 21, a radio frame is sent. The radio frame is a radio frame of a specified type and carries specific spatial multiplexing instruction information.

In some embodiments, when the radio frame is the radio frame of the specified type, a spatial multiplexing parameter information domain of a physical layer signaling domain of the radio frame carries the specific spatial multiplexing instruction information, and the specific spatial multiplexing instruction information is instruction information for delaying spatial multiplexing.

In some embodiments, the radio frame of the specified type includes at least one of: a channel measurement frame; a channel measurement announcement frame; a channel information feedback poll trigger frame; and a channel information feedback frame.

In some embodiments, if the radio frame is a channel feedback poll frame, a spatial multiplexing parameter carried by a medium access control layer protocol data unit is configured to be the instruction information for delaying the spatial multiplexing.

Figure 4:
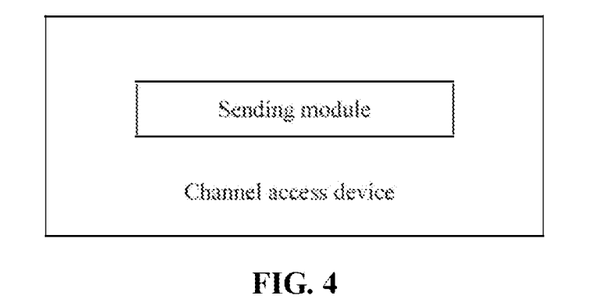
FIG. 4 is a schematic diagram of a channel access device according to an embodiment of the present disclosure.

As shown in FIG. 4, the embodiment provides a channel access device. The device includes: a sending module, which is configured to send a radio frame, the radio frame is a radio frame of a specified type or carries specific spatial multiplexing instruction information.

In some embodiments, the sending module is configured such that when the sent radio frame is the radio frame of the specified type, a spatial multiplexing parameter information domain of a physical signaling domain of the radio frame carries the specific spatial multiplexing instruction information, and the specific spatial multiplexing instruction information includes instruction information for prohibiting spatial multiplexing or instruction information for delaying the spatial multiplexing.

In some embodiments, the radio frame of the specified type includes any one of: a channel measurement frame; a channel measurement announcement frame; a channel information feedback poll trigger frame; and a channel information feedback frame.

If the radio frame is a channel feedback poll frame, a spatial multiplexing parameter of a medium access control data unit is configured to be the instruction information for prohibiting the spatial multiplexing.

The embodiment of the present disclosure further provides a channel access device including a memory and a processor.

The memory is configured to store the following instructions: sending a radio frame, where the radio frame is a radio frame of a specified type or carries specific spatial multiplexing instruction information.

The processor is configured to execute the instructions stored in the memory.

In this embodiment, an implementation mode in which a receiving end receives a radio frame and performs channel access is provided. In a radio communication system, especially, in a WLAN, stations in a BBS A receive a WLAN radio frame of a BBS B at a radio air interface and determine whether spatial multiplexing and channel access may be performed. The following steps are included.

In step 101, the radio air interface receives a radio frame #1, and views a high efficiency signal A (HE-SIG-A) in a PPDU #1 in the physical layer, and determine whether the PPDU #1 is an NDP frame by a length field and an Nsts field of a legacy signal (L-SIG). If the PPDU #1 is the NDP frame, the process goes to step 103; otherwise, the process goes to step 102.

In step 102, whether instructions of the domain are SR-Delay is determined by in an SR domain in the HE-SIG-A in the physical layer. If instructions of the domain are the SR-Delay, the process goes to step 104; otherwise, the process goes to step 101.

In step 103, a transmission opportunity (TXOP) duration is obtained in a TXOP duration domain in the HE-SIG-A domain of a PPDU #2 obtained in the physical layer. The station updates the NAV by the TXOP, and performs an enhanced distributed channel access (EDCA) operation of the non-spatial multiplexing during the NAV timing.

In step 104, MAC layer data is parsed according to MAC layer frame header information, and the radio frame #1 satisfies specified frame type is determined by type and subtype information.

The specified frame type includes an NDPA frame, a channel information feedback poll trigger frame and a channel information feedback frame.

In step 105: when a receiving frame is the NDPA frame, the channel information feedback poll trigger frame or the channel information feedback frame, the NAV of this station is updated by duration information in an MAC layer.

Figure 5:
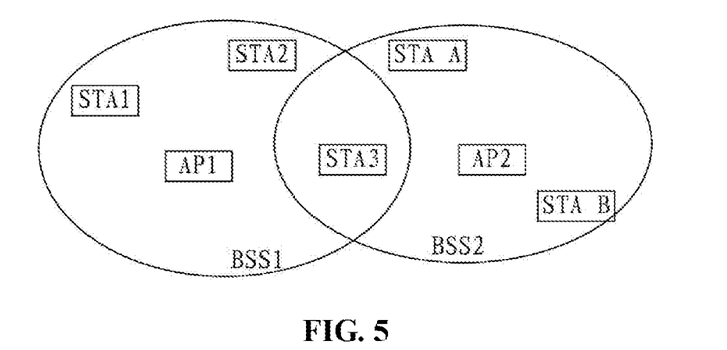
FIG. 5 is a schematic diagram of a multi-BSS network according to an embodiment of the present disclosure.

In this embodiment, an implementation mode of receiving a radio frame at a receiving end and performing channel access is provided. Two BSS networks are provided, a BSS1 and a BSS2, as shown in FIG. 5. The BSS1 network has an STA1, an STA2, an STA3 and an AP1, the BSS2 network has an STA A, an STA B and an AP2, and the STA3 is at an overlapping area.

On a Sending Side

Figure 6:
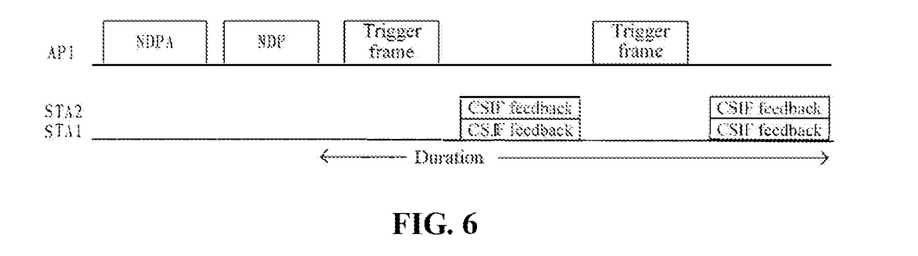
FIG. 6 is a schematic diagram of a channel measurement sequence according to an embodiment of the present disclosure.

In the BSS1, the AP1 sends the NDPA frame to initiate a channel measurement frame sequence for measuring uplink channel information of the STA2 and the STA1, as shown in FIG. 6.

On an AP1 side, the following frames are sent sequentially.

The NDPA frame is sent to initiate the channel measurement sequence in which channel measurement information of a target is carried.

The NDP frame is sent. This frame is used for the station measuring downlink channel information. A characteristic of the frame is that no data domain is provided and only a preamble and a PE (frame extension) are included.

A sending station configures a SR domain in a signaling field HE-SIG-A in the physical layer PPDU in the NDPA and NDP frames, indicating that during this frame length, the space multiplexing is prohibited.

Figure 7:
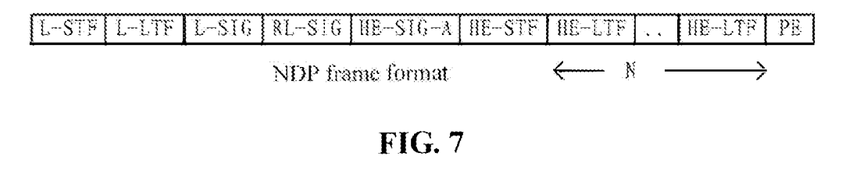
FIG. 7 is a schematic diagram of a null data packet (NDP) frame format according to an embodiment of the present disclosure.

The NDP frame sent by the AP1 is used for channel measurement from an access point (AP) to the station. After a destination station receives this frame, channel information from the AP to the station is measured by a HE-LTF domain and fed back to the AP. The characteristic of this frame is that no data domain is provided, as shown in FIG. 7.

A total length of the NDP varies according to the number of HE-LTFs. The number of HE-LTFs may be obtained by an Nsts field of the HE-SIG-A.

According to a Length field of L-SIG and the number of HE-LTFs, the station, especially a third-party OBSS station, may determine that this frame is the NDP frame according to the length and the number of HE-LTFs. In the NDP using 4X HE-LTF, the length corresponding to different numbers of HE-LTFs is as shown in table 1.

TABLE 1

| Nsts field | The number of HE-LTFs | Length |
|---|---|---|
| 1 | 1 | 22 |
| 2 | 2 | 34 |
| 3 | 4 | 58 |
| 4 | 4 | 58 |
| 5 | 6 | 82 |
| 6 | 6 | 82 |
| 7 | 8 | 106 |
| 8 | 8 | 106 |

The channel information feedback poll trigger frame is sent. Multiple target stations are scheduled to send uplink channel information feedback, and the trigger frame allocates bandwidth resources to multiple stations.

On a Receiving Side, in the BSS1 Network

On the STA1/STA2 side, the following frames are sent sequentially.

After the station receives the NDPA frame, the NDPA is determined by the frame type, and a STA info field is parsed, and channel information to be measured corresponding to the station is obtained.

The NDP frame is received and the channel information is obtained by measuring the HE-LTF in the NDP.

The channel information feedback poll trigger frame is received and the allocated channel resources are obtained.

Channel state information (CSI) feedback is sent. According to the feedback type in the NDPA, information such as a channel guide matrix V, and each stream average signal-to-noise ratio (SNR) of a channel may be fed back.

When the station in the BSS2 receives and recognizes that this frame is a valid WLAN signal of the BSS1 by the radio air interface, and obtains the SR domain through parsing, and determines that the frame is the NDPA frame. The station updates the NAV according to duration information in the MAC layer signaling domain.

On a Receiving Station in the BSS2 Network

When the station STA3 in the BSS2 in this embodiment receives a WLAN radio frame, the station determines that this frame is from the OBSS network, i.e., from the WLAN radio frame in the BSS1, by a BSS color (the BSS network color, note: network identification information). By parsing the physical layer signaling, the Nsts field and the length field are obtained to satisfy the pairing, and then the frame is determined to be the NDP frame.

After the station STA3 confirms that the frame is the NDP frame, the length of the remaining TXOP in the channel measurement sequence may be obtained by a TXOP duration domain of the HE-SIG-A field in the NDP frame.

The OBSS station may determine that an interaction sequence of this frame is the channel measurement sequence. According to the TXOP duration domain, if the length of the remaining TXOP is greater than a value of the NAV of the current station, the NAV is updated, the current backoff process is suspended, and the subsequent multiplexing is not performed to send the radio frame. Therefore, the channel measurement sequence performed by other stations will not be influenced.

In a wireless communication system, especially in a wireless local area network, the station STA1 in the BSS1 receives the WLAN radio frame from the BSS2 by the radio air interface. Whether this frame is the NDPA frame is determined and whether to perform the spatial multiplexing is determined by the following method. The method includes the steps described below.

In step 201: the receiving station STA1 receives the radio frame #1 at the radio air interface, determines that this frame is from the WLAN frame in the BSS2 network by the BSS2 network color, and whether the SR domain in the HE-SIG-A in the PPDU #1 is the SR-Delay is viewed in the physical layer. If the SR domain is the SR-Delay, the process goes to the step 202; otherwise, the process continues to go to the step 201.

In step 202: a medium packet data unit (MPDU) of MAC layer data is parsed. Whether the frame is the NDPA frame is determined by a type domain and a subtype domain. If this frame is the NDPA frame, the process goes to the step 203; otherwise, the process goes to the step 201.

In step 203: by a duration domain of the MAC layer, the TXOP duration is obtained, the NAV is updated, i.e., the channel access is not performed within the TXOP duration.

In the wireless local area network, especially in an 802.11ax-protocol-based WLAN network, in an area having two BSSs, as shown in FIG. 5, the BSS1 includes an STA #1, an STA #2, and an STA #3, the BSS2 includes an STA A and an STAB, and the STA #3 is in the overlapping area.

On a Sending Side

The NDPA is sent by the AP1 in the BSS1 to initiate a channel measurement request for measuring downlink channel quality from the AP to the STA #3 and the STA #2.

On a Receiving Side

The station STA A in the BSS2 receives the radio frame in the radio air interface.

First, the STA A detects the BSS network color in the physical layer of this frame, determines that this frame is the WLAN radio frame sent by the OBSS station, and then determines whether the frame is SR-Delay by the SR domain.

The SR domain is the SR-Delay. The STA A continues to parse the MAC layer data, and determines the frame type by the type and the subtype. When this frame is the channel information feedback poll trigger frame, the NAV is updated by the duration domain in the MAC layer data, i.e., the spatial multiplexing is not performed in this duration.

In the wireless communication system, especially in a wireless local area network, the station STA1 in the BSS1 receives the radio frame from the BSS2. Whether the frame is the NDP frame is determined by the following method, and relevant operations are performed. The method includes the steps described below.

In step 301, the radio air interface receives the radio frame #1, and determines whether the PPDU #1 is the NDP frame by the length field and the Nsts field of the L-SIG in the physical layer. If the PPDU #1 is the NDP frame, the process goes to the step 304; otherwise, the process continues to go to the step 302.

In step 302: the physical layer views whether the SR domain in the PPDU #2 satisfies a spatial multiplexing condition. If the SR domain satisfies the spatial multiplexing condition, the process goes to the step 303; otherwise, the process goes to the step 301.

In step 303, the station performs the spatial multiplexing and sends the radio frame.

In step 304, the transmission opportunity (TXOP) duration is obtained in the TXOP duration domain in the HE-SIG-A domain of the PPDU #2 obtained in the physical layer. The station updates the NAV by the TXOP, and does not perform the spatial multiplexing within the duration.

In the wireless local area network (WLAN), especially in a communication process of a HE station based on the 802.11ax WLAN, the channel measurement process is an important means to ensure the correct data transmission. Therefore, the station identifies the channel measurement sequence, so that a channel access mode with the spatial multiplexing or a channel access mode with the non-spatial multiplexing can be used. In the following scenario, two BSS networks are provided, the BSS1 has the STA #1, the STA #2, and the STA #3 and the AP1, and the BSS2 has the STA A, the STA B and the AP2, as shown in FIG. 5.

The NDPA is sent by the AP1 in the BS S1 to initiate the channel measurement sequence frame interaction for measuring downlink channel from the AP1 to the STA #1 and the STA #4, as shown in FIG. 6.

In step 401, the STA A in the BSS2 receives the radio frame #1 in the AP1 at the radio air interface, and the STA A parses physical layer signaling of this frame by the length field in the L-SIG and the Nsts field of the HE-SIG-A to determine whether this frame is the NDP frame. If this frame is non-NDP frame, the process goes to the step 402. When this frame is the NDP frame, the process goes to the step 403.

In step 402: the STA A parses the SR domain in the HE-SIG-A signaling in the physical layer. When a specific SRP parameter in the SR domain is SR-delay, the process goes to the step 404; otherwise, according to determination of other SR instructions, corresponding operations are performed.

In step 403: when the frame is the NDP, the STA A obtains the TXOP duration in the HE-SIG-A, the STA A updates the NAV, and does not perform the spatial multiplexing within the TXOP duration.

In step 404, the STA A continues to parse the frame type of the MAC layer. According to the type and subtype, the frame is the NDPA frame, and the NAV is updated by duration information of the duration domain of the MAC layer.

In an 802.11ax-based network, as shown in FIG. 5, in the BSS network, the AP measures downlink channel information of the station 1 and the station 2.

In step 501: the AP sends the NDPA frame, carries target station identification information and channel information that needs to be measured by the corresponding target station, which includes a feedback guiding matrix angle quantization, feedback bandwidth information, and a feedback stream number.

In step 502, the AP sends the NDP frame at a short interframe space after sending the NDPA frame for the specified station measuring the downlink channel information from the AP to the specified station.

In step 503: the AP sends a trigger frame, and the station 1 and the station 2 are scheduled to send the measured channel information, and a spatial multiplexing instruction in the spatial multiplexing domain in the physical layer of this frame is configured to be the SR-Delay.

The channel information may include a degree of quantization of a guiding matrix, an average SNR of each spatial stream, a delta SNR of each subcarrier. The channel information bandwidth declares a range of feedback bandwidth in the NDP.

In step 504: after the station 1 and the station 2 receive the trigger frame, and after the SIFS, the station 1 and the station 2 send trigger-based PPDU to feedback channel information from the AP to the stations in a UL OFDMA mode.

In step 505, the OBSS station STA A receives the WLAN frame from the BSS1 at the radio air interface, and determines that the PPDU is the WLAN frame from the BSS 1 by the BSS color.

In step 506, the STA A determines the pre-defined spatial multiplexing instruction SR-Delay is met according to the spatial multiplexing instruction in the spatial multiplexing domain in the physical layer.

In step 507, the station STA A continues to parse the MAC frame. When the preset frame type is the channel feedback poll frame, the NAV is updated according to the duration information in the MAC frame.

In a WLAN network, the station of the BSS1 receives a WLAN radio frame, and that the frame is from the OBSS network is obtained by the BSS network color domain in the physical layer.

That the SR domain is the SR-delay is obtained by the SR domain of the physical layer, and then a PPDU frame format is determined, and this frame is a trigger-based PPDU.

The station obtains the duration information in the TXOP duration domain in the HE-SIG-A in the physical layer of the frame, updates the NAV of this station, and does not perform the spatial multiplexing operation.

In a WLAN network, the station of this BSS receives a WIFI radio frame, and that the frame is from the OBSS network is obtained by the BSS network color domain in the physical layer.

That the SR domain is the SR-delay is obtained by the SR domain of the physical layer, and then a PPDU frame format is determined, and this frame is a single user (SU) frame format.

The station parses the MAC layer data to obtain that this frame is a management frame, and the subtype is an action frame, and further obtains that this frame is a channel information feedback frame.

The station configures the NAV of the station by information in the duration domain in the MAC layer, and does not perform the spatial multiplexing.

By the radio frame sent by the station/AP, in an SRG network, the OBSS station belonging to the same manageable network as the BSS, does not perform the spatial multiplexing, and signaling in the spatial multiplexing domain is configured to be delaying the spatial multiplexing.

In a WLAN network, the station receives a radio signal, by matching signal characteristics, this frame being the WLAN frame is obtained, and a physical layer signaling field is parsed. By the BSS color, this frame is determined to be a frame in the OBSS network, and this frame is determined and obtained to be a Non SRG frame, i.e., this frame is not in an SRG network. The station directly parses the signaling of the spatial multiplexing domain, and obtains that the signaling of this domain indication is the SR-Disallow, and then the station does not perform the spatial multiplexing within this PPDU duration, and updates the NAV of this station by using the duration information.

The embodiment of the present disclosure provides a computer storage medium for storing computer-executable instructions, after being executed, the computer-executable instructions are capable of implementing the channel access method provided by one or more technical solutions.

The computer storage medium provided by this embodiment may be various types of storage mediums. Optionally, the storage medium may be a non-transitory storage medium.

It will be understood by those of ordinary skill in the art that all or part of the steps in the method described above may be implemented by related hardware instructed by one or more programs, and these programs may be stored in a computer-readable storage medium such as a ROM, a magnetic disk, an optical disk or the like. Optionally, all or some steps in the embodiments described above may also be implemented by using one or more integrated circuits. Each module/unit in the above embodiments may be implemented by hardware or a software function module. The present invention is not limited to any specific combination of hardware and software.

The above are only optional embodiments of the present disclosure. The present disclosure may have other various embodiments. Corresponding modifications and variations may be made by those skilled in the art according to the present disclosure without departing from the spirit and essence of the present disclosure. However, these corresponding modifications and variations fall within the scope of the claims in the present disclosure.

What is claimed is:

1. A channel access method implemented at a wireless station, comprising:
   after a radio frame is received, determining that the radio frame is an overlapping basic service set (OBSS) radio frame;
   subsequent to determining that the radio frame is an OBSS radio frame, determining that the OBSS radio frame prohibits a spatial multiplexing based on a specified type of radio frame for the OBSS radio frame being a trigger-based physical packet data unit (PPDU) according to a parameter in a physical layer signal domain;
   based on (i) the radio frame being an OBSS radio frame and (ii) the specified type being a trigger-based PPDU, updating a local network allocation vector according to duration information carried in the OBSS radio frame prohibiting the spatial multiplexing, wherein the updated local network allocation vector represents an end time of a transmission opportunity in which the OBSS radio frame prohibiting the spatial multiplexing is located;
   in response to determining that the OBSS radio frame prohibits the spatial multiplexing based on a power detection (PD) threshold, configuring the wireless station using a higher overlapping basic service set-power detection (OBSS-PD) threshold to perform spatial multiplexing transmission; and
   performing channel access according to the local network allocation vector.

2. The method of claim 1, wherein determining that the radio frame is the OBSS radio frame comprises:
   determining that the radio frame is the OBSS radio frame according to basic service set (BSS) identification information of a physical signaling domain of the radio frame.

3. The method of claim 1, wherein before determining the specified type of radio frame for the OBSS radio frame to be the trigger-based PPDU, the method further comprises:
   determining that a physical signaling domain of the OBSS radio frame carries specific spatial multiplexing instruction information.

4. The method of claim 3, wherein the specific spatial multiplexing instruction information comprises:
   instruction information for prohibiting spatial multiplexing or instruction information for delaying the spatial multiplexing.

5. The method of claim 4, wherein
   the instruction information for prohibiting the spatial multiplexing is instruction information for prohibiting spatial multiplexing based on an OBSS signal detection threshold and/or prohibiting spatial multiplexing based on a spatial multiplexing parameter.

6. The method of claim 1, wherein the determining the specified type of the radio frame for the OBSS radio frame to be the trigger-based PPDU according to the parameter in the physical layer signaling domain comprises:
   parsing values of a length field and a spatial streams (Nsts) field from the physical layer signaling domain, and in response to determining that the values of the length field and the Nsts field satisfy a preset relationship, determining the specified type of radio frame for the OBSS radio frame, or
   determining the specified type of radio frame for the OBSS radio frame according to a physical frame format indication information.

7. The method of claim 1, further comprising determining the specified type of radio frame for the OBSS radio frame according to a parameter in a signaling domain of a medium access control layer protocol data unit based on:
   parsing a type field and/or a subtype field of the radio frame from the signaling domain of the medium access control layer protocol data unit, and determining the specified type of radio frame for the OBSS radio frame according to the type field and/or the subtype field.

8. The method of claim 7, wherein the determining the specified type of radio frame for the OBSS radio frame according to the type field and/or the subtype field comprises:
   determining that the radio frame is a channel measurement announcement frame, a channel information feedback poll trigger frame or a channel information feedback frame according to the type field and/or the subtype field.

9. The method of claim 1, wherein updating the local network allocation vector according to the duration information carried in the radio frame comprises:
updating the local network allocation vector according to transmission opportunity duration information carried in the physical layer signaling domain of the radio frame, or
updating the local network allocation vector according to duration information carried in a medium access layer signaling domain of the radio frame.

10. The method of claim 1, further comprising:
updating the local network allocation vector by using the duration information in a physical layer if the OBSS radio frame is determined to be a Null Data Packet (NDP) frame.

11. The method of claim 1, further comprising:
updating the local network allocation vector by using the duration information in a physical layer if the OBSS radio frame is determined to be not a Null Data Packet (NDP) frame and if spatial multiplexing information and a frame type indication of the physical layer both satisfy a determination condition.

12. A channel access device, comprising:
a determination module, which is configured to:
determine that a radio frame is an overlapping basic service set (OBSS) radio frame after the radio frame is received, and
subsequent to determining that the radio frame is an OBSS radio frame, determine that the OBSS radio frame prohibits a spatial multiplexing based on a specified type of radio frame for the OBSS radio frame being a trigger-based physical packet data unit (PPDU) according to a parameter in a physical layer signaling domain;
an updating module, which is configured to:
based on (i) the radio frame being an OBSS radio frame and (ii) the specified type being a trigger-based PPDU, update a local network allocation vector according to duration information carried in the OBSS radio frame prohibiting the spatial multiplexing, wherein the updated local network allocation vector represents an end time of a transmission opportunity in which the OBSS radio frame prohibiting the spatial multiplexing is located; and
in response to determining that the OBSS radio frame prohibits the spatial multiplexing based on a power detection (PD) threshold, configure the channel access device using a higher overlapping basic service set-power detection (OBSS-PD) threshold to perform spatial multiplexing transmission; and
an access module, which is configured to perform channel access according to the local network allocation vector.

13. The device of claim 12, wherein
the determination module is configured to determine that the radio frame is the OBSS radio frame according to basic service set (BSS) identification information of a physical signaling domain of the radio frame.

14. The device of claim 12, wherein
the determination module is configured to determine that the physical signaling domain of the radio frame carries spatial multiplexing instruction information, wherein the spatial multiplexing instruction information comprises: instruction information for prohibiting spatial multiplexing or instruction information for delaying the spatial multiplexing, and the instruction information for prohibiting the spatial multiplexing is instruction information for prohibiting spatial multiplexing based on an OBSS signal detection threshold and/or prohibiting spatial multiplexing based on a spatial multiplexing parameter.

15. The device of claim 14, wherein the updating module is further configured to update a network allocation vector by using the duration information if the OBSS radio frame is not a Null Data Packet (NDP) frame, the spatial multiplexing instruction satisfies a determination condition, and a frame type of a physical layer does not satisfy the determination condition.

16. The device of claim 12, wherein
the determination module is configured to parse values of a length field and a spatial streams (Nsts) field from the physical layer signaling domain, and in response to determining that the values of the length field and the Nsts field satisfy a preset relationship, determine the specified type of the OBSS radio frame; or determine the specified type of radio frame for the OBSS radio frame according to physical frame format indication information.

17. The device of claim 12, wherein
the determination module is configured to parse a type field and/or a subtype field of the radio frame from a signaling domain of a medium access control layer protocol data unit, and determine the specified type of radio frame for the OBSS radio frame according to the type field and/or the subtype field.

18. The device of claim 17, wherein
the determination module is configured to determine that the radio frame is a channel measurement announcement frame, a channel information feedback poll trigger frame or a channel information feedback frame according to the type field and/or the subtype field.

19. The device of claim 12, wherein
the updating module is configured to update the local network allocation vector according to transmission opportunity duration information carried in the physical layer signaling domain of the radio frame, or update the local network allocation vector according to duration information carried in a medium access layer signaling domain of the radio frame.

20. A channel access device, comprising a memory and a processor, wherein
the memory is configured to store instructions; and
the processor is configured to execute the instructions stored in the memory to:
determine that a radio frame is an overlapping basic service set (OBSS) radio frame;
subsequent to determining that the radio frame is an OBSS radio frame, determine that the OBSS radio frame prohibits a spatial multiplexing based on a specified type of radio frame for the OBSS radio frame being a trigger-based physical packet data unit (PPDU) according to a parameter in a physical layer signaling domain;

in response to (i) the radio frame being an OBSS radio frame and (ii) the specified type of radio frame for the OBSS radio frame being the trigger-based PPDU, update a local network allocation vector according to duration information carried in the OBSS radio frame prohibiting spatial multiplexing, wherein the updated local network allocation vector represents an end time of a transmission opportunity in which the OBSS radio frame prohibiting the spatial multiplexing is located; and perform channel access according to the local network allocation vector.

\* \* \* \* \*